INFRA-RED RADIANT HEATER AND GRID THEREFOR

Original Filed May 28, 1964 6 Sheets-Sheet 1

INVENTOR
ARTHUR C. W. JOHNSON

ATTORNEY

April 4, 1967 A. C. W. JOHNSON 3,312,269

INFRA-RED RADIANT HEATER AND GRID THEREFOR

Original Filed May 28, 1964 6 Sheets-Sheet 2

INVENTOR
ARTHUR C.W. JOHNSON

Benjamin W. Coleman

ATTORNEY

INFRA-RED RADIANT HEATER AND GRID THEREFOR

Original Filed May 28, 1964 6 Sheets-Sheet 3

INVENTOR
ARTHUR C. W. JOHNSON

Benjamin W. Coleman

ATTORNEY

INVENTOR
ARTHUR C. W. JOHNSON
Benjamin W. Calman
ATTORNEY

INFRA-RED RADIANT HEATER AND GRID THEREFOR

INVENTOR
ARTHUR C. W. JOHNSON
Benjamin Wolman
ATTORNEY

INVENTOR
ARTHUR C. W. JOHNSON

Benjamin W. Calman

ATTORNEY

United States Patent Office 3,312,269

Patented Apr. 4, 1967

3,312,269

INFRA-RED RADIANT HEATER AND GRID THEREFOR

Arthur C. W. Johnson, Troy, Mich., assignor to Combustion Research Corporation, Troy, Mich., a corporation of Michigan

Continuation of abandoned application Ser. No. 370,795, May 28, 1964. This application Apr. 6, 1966, Ser. No. 540,561

16 Claims. (Cl. 158—99)

This application is a continuation of application Ser. No. 370,795, filed May 28, 1964, which was a continuation-in-part application of my earlier filed application, No. 287,101, filed June 11, 1963, both of which are now abandoned.

This invention pertains to an infra-red radiant heater and grid therefor and more particularly to an improved heater embodying a grid radiator having integrally formed shields over flame and combustion gas openings in the body thereof whereby the hot gases are passed laterally over and scrub the shields and the grid body laterally and thereby discharge a maximum of their heat by convection and gas radiation into the grid radiator or the re-radiator.

This invention involves a fluid fuel burner which incorporates means for delivering a combustible mixture such as a mixture of gas and air or oil and air to a combustion space where the mixture burns, heating a radiant grid to incandescence.

The burner may be of any desired or suitable configuration, and the fuel may be natural gas, propane, manufactured gas or a vaporized or atomized liquid, or even a finely dispersed solid fuel.

A radiant grid having integrally formed shields adjacent lateral openings therein is disposed adjacent to the combustion space so as to be heated by radiation from the flames and/or by contact with the combustion gases, which pass through the lateral openings and around the material from which the grid is formed.

The radiant grid is preferably formed of a sheet metal material. For operation at elevated temperatures of the order of 1000–2700° F., a high temperature oxidation-resistant metal is preferred. Or, another material such as ceramic grids or fibers can be used. However, the material should preferably have a good thermal conductivity which permits it to attain a uniform high temperature, such as a sintered carbide. These metals and ceramic materials have high oxidation-resistance properties at the operating temperatures specified and give substantially longer useful lives as radiant grids. Materials which can also be utilized include 80/20(330) Nickel-Chrome alloy, 20/15(310) Nickel-Chrome alloy, Hoskins No. 875 alloy, Driver Harris No. 245 alloy, Kanthal A-1 and Super Kanthal alloys.

The radiant grid of this invention is provided with openings formed by shearing the sheet metal at intervals and pressing the portions adjacent the shear lines outwardly and/or inwardly so as to form laterally shielded openings in the body of the metal, i.e., no transverse perforations or pierced openings are formed, the shear lines providing a means whereby the metal adjacent the shear lines can be pushed laterally outwardly, or laterally outwardly and inwardly, or laterally inwardly, and form shields adjacent the openings that appear at the shear lines. Thus, the plane of each of the openings is substantially normal to the plane of the body of the radiant grid. The gases exit laterally over the body surface instead of normal through the body. By this construction, optimum utilization is made of the heat energy in the flame. A maximum of heat transfer to the grid and radiation from the grid is obtained since there are no openings in the grid body, except in planes all normal to the surface of the grid body, thus providing the maximum internal surface of the grid exposed to the combustion heat and maximum external surface for radiation of infra-red energy, while providing for maximum scrubbing action of the combustion gases over the grid surfaces as they pass through the lateral openings that are perpendicular to the inner and outer surfaces of the radiant. These gases heat the grid to incandescence and convert a maximum portion of their total heat to infra-red radiation.

Such efficient utilization of the heat is not possible in structures where the gases exit directly (i.e., normal) through woven or pierced screens or panels, or exit through ports pierced normal to the body of the radiator, or where they impinge upon the inside surface of a solid radiator and not the outside surface or impinge upon the outer surface of a relatively solid radiator.

Where there are such openings pierced normal through the radiant grid body the area of these openings reduces the internal heat absorbing surface and the external radiating surface. In prior structures of this type the loss of surface varies from 30% to 60% of the total area of the radiant, due to the area of the holes. Further, the heated gases passing through the center portions of such openings cannot scrub the surfaces of the grid.

In addition, the radiant grid of this invention functions as a re-radiator, radiating and reflecting heat back and forth between grid surface, thus amplifying and intensifying the temperature of the combusted gases. Yet another advantageous result of such disposition of the openings is that the flame is almost impervious to external air current or wind conditions, it being extremely difficult to quench or blow out the flame at the burner surface, ports or jets.

While the burner may be of any suitable configuration, it must be so designed that combustion will occur only in the combustion space so that premature combustion or back firing into the burner tube or distribution chamber will not occur. Hence, the invention provides in combination with the radiant grid, orifices through the wall of the burner tube or distribution chamber to carry the combustible mixture to the combustion space. Such orifices may be incorporated into a corrugated ribbon orifice grid, the spaces between the ribbons forming orifices through which gas passes from the distribution chamber to the combustion space. While other means for providing suitable orifices may be used the invention provides a structure of ribbon orifices which are especially suitable for the characteristics of the heater.

Since the radiant grid totally encloses the flame, and the hot combustion products are discharging through all the radiant grid openings, in a number of forms of the invention the air for combustion is mixed with the fuel as primary air before the fuel enters the burner, and there is no supply of secondary air to the flame. Thus the ports or orifice grid in the burner tube must handle a substantially greater volume of air than is the case where the burner is supplied with a secondary atmospheric air at the flame. Also, since in a number of forms of the invention the fuel is premixed with enough air for its complete combustion, the ports in the burner orifice grid must be constructed to prevent backfire into the burner tube in spite of handling the large volume of mixture.

The tendency to backfire is further increased by the very high temperature which exists within the combustion space between the radiant grid and the outside of the orifice grid and the close proximity of the high temperature radiant grid to the orifice grid.

The tendency to backfire is further increased where these burners are incorporated into ovens and furnaces where the mixture tube may be located in a space having a very high temperature, and by operation of the burner with the radiant grid below the mixture or burner tube so that the tube is heated by rising products of combustion as well as by radiation.

In order to prevent flashback under these severe operating conditions, while still permitting the flow of a large volume of mixture to provide the high output which must be delivered by the burner, the ports in the orifice grid must be very narrow in relation to their depth to prevent flame from passing through, the number of ports must be great enough to supply the required amount of mixture and the velocity through the tube must be high enough to cool the mixture tube and keep it well below the ignition temperature of the mixture.

The novel combination of radiant grid and burner produces a heater having greater amount of infra-red radiation and which can attain higher temperatures than heaters of the prior art. Actually the limit of the temperature attained is determined by the material of the radanit grid. The heater provided by this structure is of particular advantage in specific applications.

Certain applications require equipment which will provide a high output of infra-red radiation in minimum space. An example is a heater for insertion in the nozzle of a die casting machine.

The heater of this invention, operating with radiation grid at 2000° F., while only about 12" long, 1½" wide and 3" high, will have an output of about 40,000 B.t.u. per hour and will provide both radiant heat and convection heat within the nozzle of the die casting machine.

Certain other applications such as ground thawing require large heaters providing millions of B.t.u.'s as concentrated radiant energy. Temperatures above 2200° F. are feasible with the instant heater the practical limit depending on the material used and its life under such operating conditions.

While Inconel is most commonly used for the radiant grid, providing long life for operation at temperatures up to 1900° F., coatings are available which allow it to be used at higher temperatures, and various more expensive materials, such as Kanthal or even platinum may be employed where higher temperatures are needed and cost of the burner is relatively unimportant.

In other cases, periodic replacement of the radiant grids operating at high temperatures would not be objectionable. In this connection it should be noted that they are easily replaced.

The fuel input to the heater may be adjusted to provide any desired radiant grid temperatures from 1000° F. up to its maximum.

One of the outstanding advantages of the heater of the present invention is its ability to operate satisfactorily in winds of considerable velocity. Heaters installed out of doors in windy locations, and those tested with air moving at up to 1700 f.p.m., have performed well.

Other types of infra-red generators are adversely affected by such outdoor exposure and wind velocities, unless provided with expensive protective measures.

Since there are no fragile ceramics, fine mesh screens or other delicate components, the heater of the present invention is rugged and sturdy and is not likely to be damaged by rough handling in transit or during installation.

When used in ovens and furnaces the temperature surrounding the heater may be very high, up to 1500° F., the heater operating successfully under such conditions without flashback or other difficulty due to the specific combination of burner and radiant grid design encompassed in the present invention.

Where there is re-radiation onto the radiant grid or where the heater is operating in a high temperature atmosphere, the fuel input necessary to provide a given radiant grid temperature is reduced.

The heater is not only simple and relatively inexpensive to build, but because high output can be obtained from individual small units, the cost of a complete installation is comparatively low, since less piping and wiring and fewer controls are necessary, supporting structure is simpler and erection is easier. It is particularly adapted to use in space heaters, ovens, furnaces and for operation on piped supply of premixed gas and air. It operates equally well on gases of different compositions, such as methane and propane.

The efficiency of the heater depends on a number of factors, such as gas mixture, reflector arrangement, manifold pressure, and radiant grid temperatures. The efficiency is highest at moderate temperatures of the radiant grid and decreases with increased temperatures, that is, the increased output at higher temperatures is obtained by burning proportionally more gas.

A radiant grid construction in accordance with my invention also lends itself to use with a porous or perforated ceramic type of burner, wherein the mixture of air and fuel is forced through the ceramic and burns at the surface. In this case the radiant grid is held against the surface of the ceramic by suitable means.

The radiant grid is also useful as a re-radiator in heaters of the type where the flame itself is directed onto the surface of the object being heated, such as a moving metal sheet or a rotating drum. In such environments the radiant grid does not enclose the flame but is located on either side of a row of burner orifices to trap and absorb and then re-radiate the heat from the flame and combustion gases as they spread out against the surface of the object being heated.

It is an object of the invention to provide a gas-fired or oil-fired infra-red radiant heater having a burner and radiant grid combination in which the radiant grid is provided with shielded openings therethrough. Another object is to provide shielded openings in such grid by cutting shear lines through the body of the grid and pressing the metal body portions adjacent the shear lines laterally outwardly, or outwardly and inwardly, or laterally inwardly so as to form lateral shields and ports at such shear lines. A further object is to provide shielded openings in the radiant grid so that the flame gases are directed laterally along the surfaces of the grid body so as to wash over or scrub the radiant grid body surfaces, both inside and outside, and thus utilize more fully and efficiently the heat discharged by the flame and gases as they impinge upon the grid. Still another object is to provide shielded openings disposed in planes substantially normal to the body of the radiant grid whereby the flame is protected against blasts of air directed substantially normal to the grid body surface and that would tend to snuff-out or quench the flame. A further object is to provide a radiant heat grid with shielded openings having a re-radiating function to reinforce, amplify and intensify the heat generated by the burner. Yet another object is to provide an infra-red radiant heater and grid having improved efficiency (due to closer approach of the grid temperature to the gas temperature) and utility at lower cost for its construction and operation.

These and additional objects of the invention and features of construction will become more clearly understood from the description given below, in which the terms employed are used for purposes of description and not of limitation. Reference is made to the drawing annexed hereto forming an integral part of this specification and in which:

FIGURE 1 is a perspective view of a portion of a gas-fired infra-red heater embodying the inventive construction;

FIGURE 2 is a vertical transverse sectional view taken substantially on the line 2—2 of FIGURE 1;

FIGURE 3 is a vertical longitudinal sectional view taken through the grid radiator substantially on the line 3—3 of FIGURE 2;

FIGURE 4 is a side elevational view of the burner of

Figures 1, 2, 3, 4:
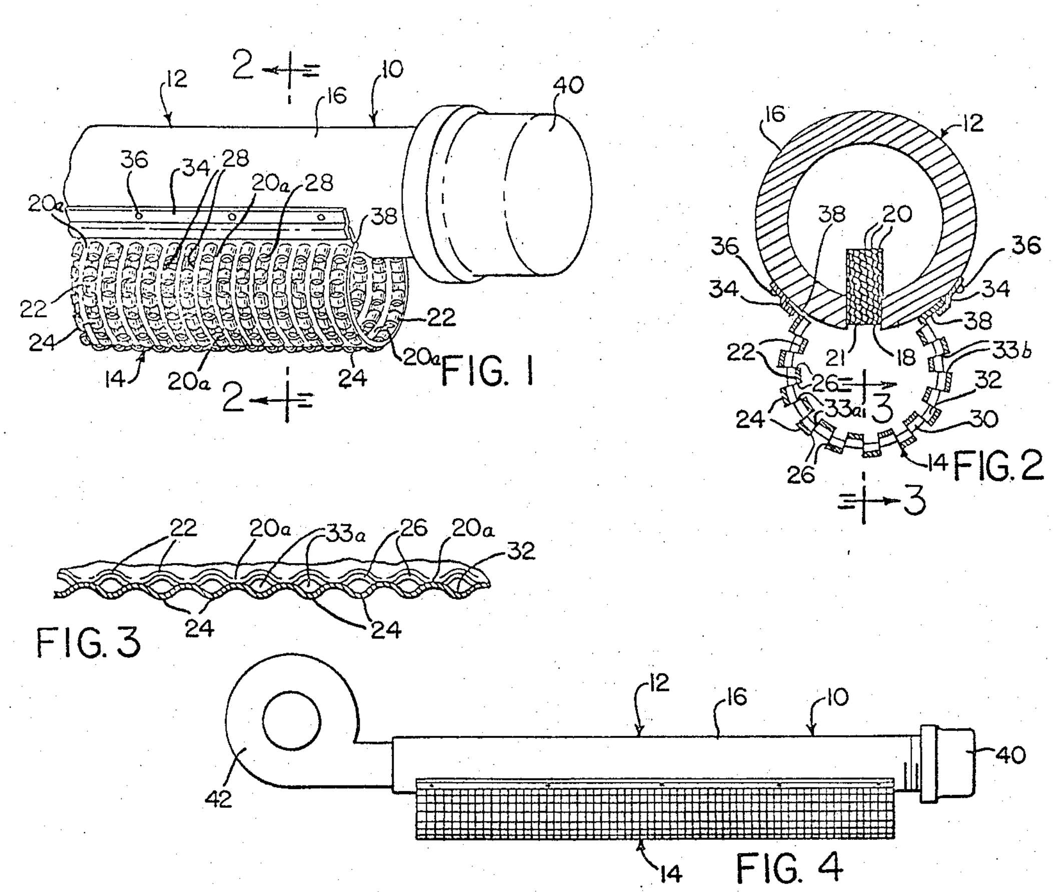
Figures 5, 6, 7:
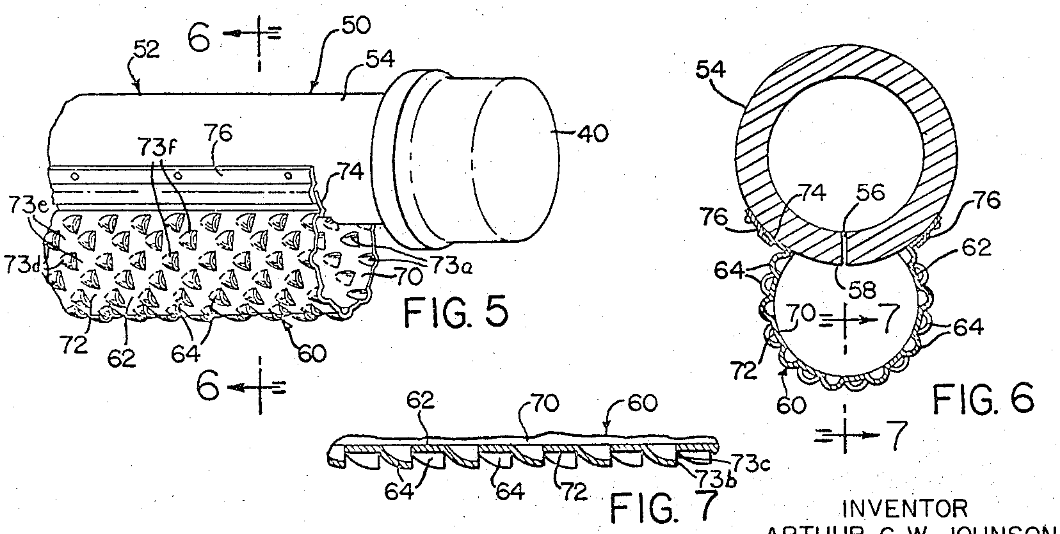

FIGURE 1 coupled to a blower unit for feeding fuel gases to the burner at an elevated pressure;

FIGURE 5 is a perspective view of a heater similar to that shown in FIGURE 1 showing a grid radiator having opening shields of a slightly different form.

FIGURE 6 is a vertical transverse sectional view taken substantially on the line 6—6 of FIGURE 5.

FIGURE 7 is a vertical longitudinal sectional view taken through the grid radiator substantially on the line 7—7 of FIGURE 6.

Figure 8:
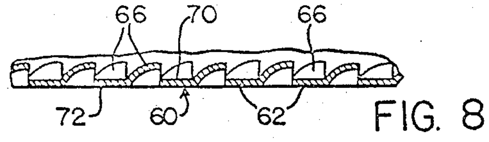

FIGURE 8 is a fragmentary sectional view of a grid radiator having opening shields that are the inverse of those shown in FIGURES 5, 6 and 7.

Figures 9, 10:
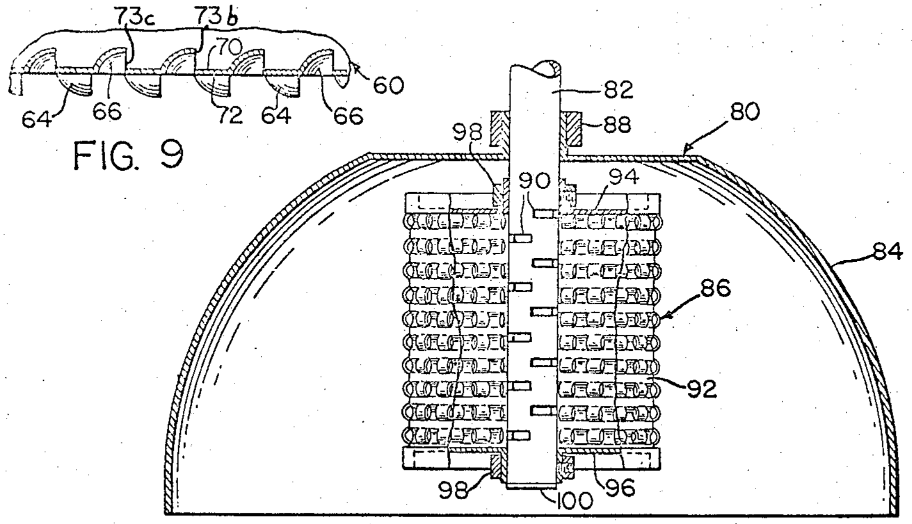

FIGURE 9 is a view similar to FIGURES 7 and 8 illustrating a combination of outwardly and inwardly directed opening shields in a grid radiator.

FIGURE 10 is a vertical sectional view, partially in elevation of a radiant heater and grid assembly arranged in circular form.

Figure 11:
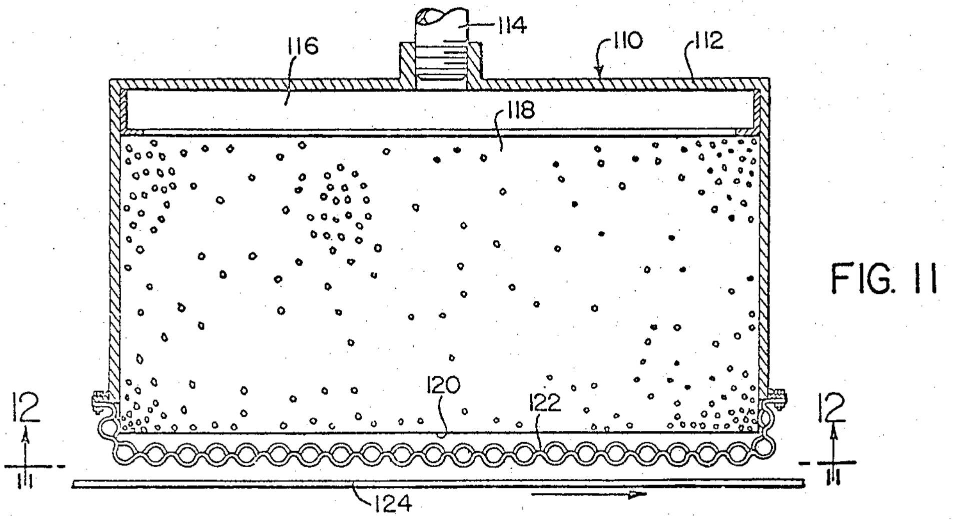

FIGURE 11 is a vertical sectional view of another form of the radiant heater and grid utilizing a porous ceramic burner and the grid of this invention.

Figure 12:
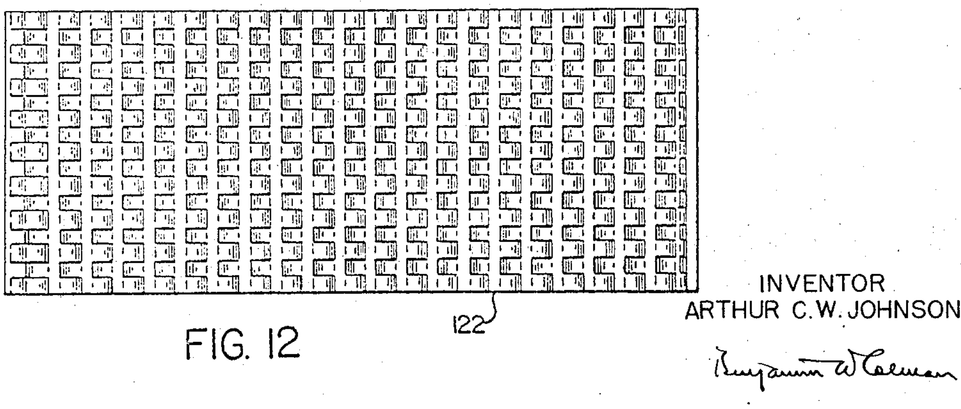

FIGURE 12 is a bottom plan view showing the grid surface taken substantially on the line 12—12 of FIGURE 11.

Figures 13, 14, 15, 16, 17:
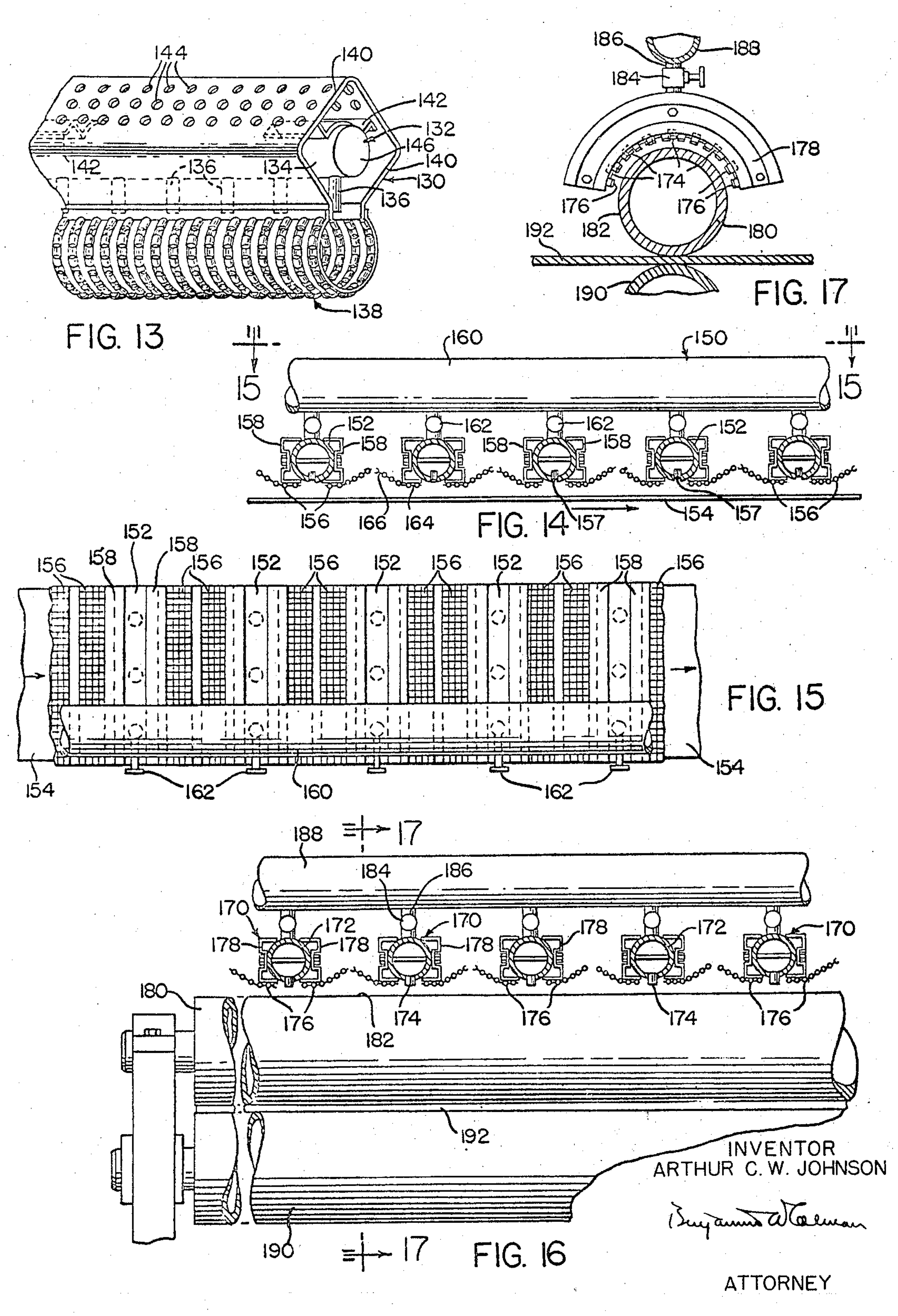

FIGURE 13 is a perspective view showing a portion of yet another form of the radiant heater utilizing the inventive concept.

FIGURE 14 is a vertical sectional view, partially in elevation, of a battery of radiant burner and grid assemblies arranged for use in heating a continuously moving planar sheet material.

FIGURE 15 is a top plan view taken substantially on the line 15—15 of FIGURE 14.

FIGURE 16 is a side elevational view, partially in vertical section, of a battery of radiant burner and grid assemblies arranged for heating a cylindrical roll.

FIGURE 17 is a slightly enlarged elevational view of the structure shown in FIGURE 16.

Figures 18, 19:
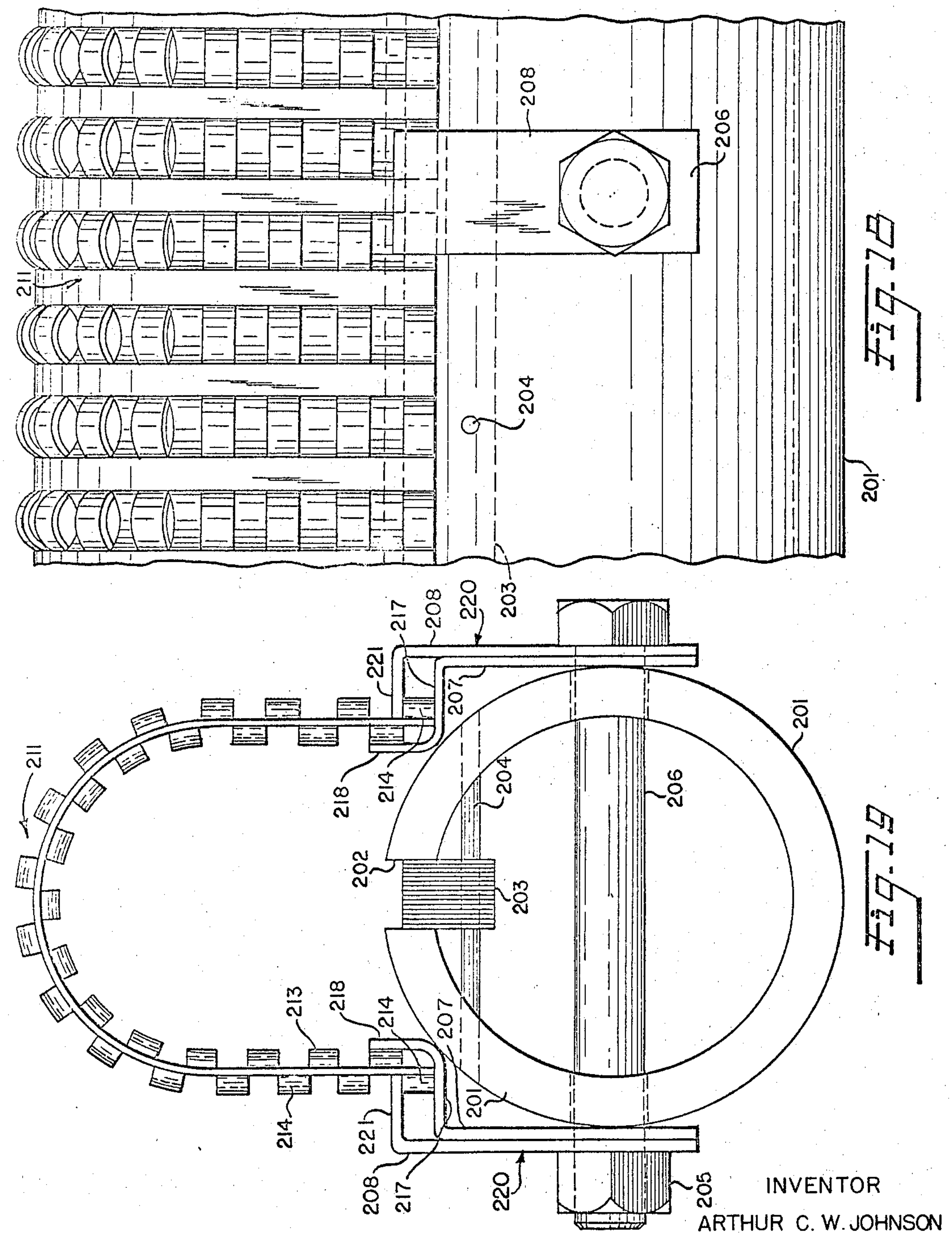

FIGURE 18 is a view in side elevation of a section of heater using another form of radiant grid and burner orifice construction.

FIGURE 19 is a view in end elevation of the heater of FIGURE 18 but with the end covers of the burner tube and radiant grid omitted.

Figure 20:
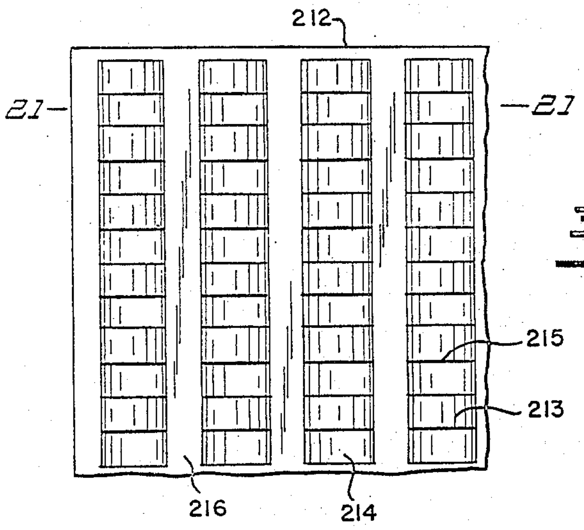

FIGURE 20 is a top plan view of a section of radiant grid after it has been sheared and stamped but before being bent into the form shown in FIGURES 18 and 19.

Figure 21:
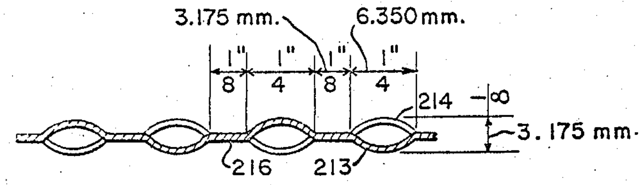

FIGURE 21 is a sectional view of the grid taken along the line 21—21 of FIGURE 20.

Figures 22, 30:
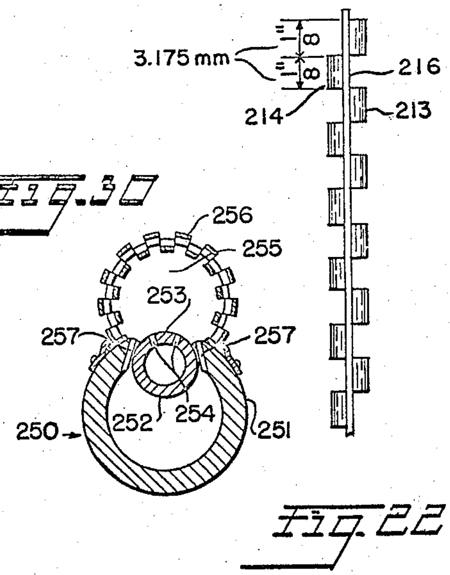

FIGURE 22 is a side view of the grid shown in FIGURE 20.

Figure 24:
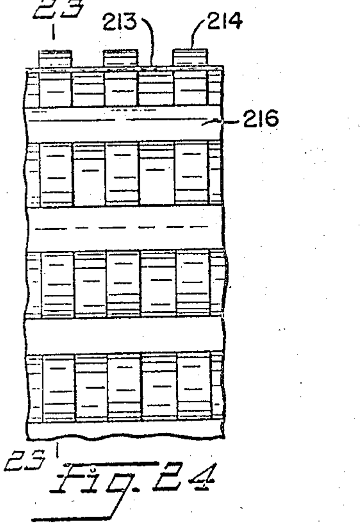
Figure 23:
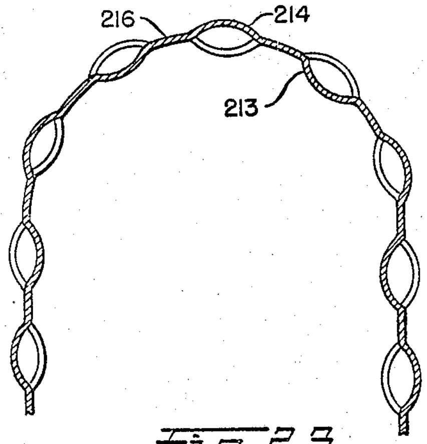

FIGURE 23 is a sectional view of the grid material of FIGURE 20 but bent around another axis and taken along the line 23—23 of FIGURE 24.

FIGURE 24 is a side view of a portion of the grid shown in section in FIGURE 23.

Figure 25:
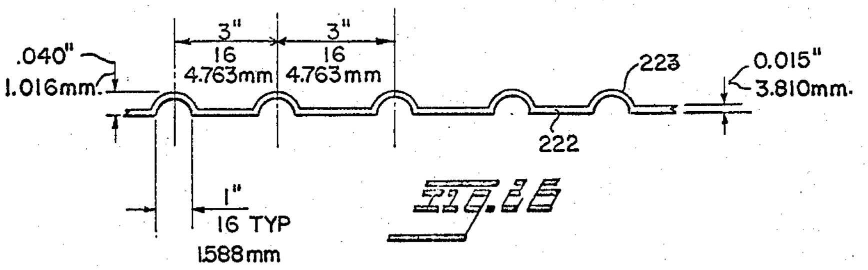

FIGURE 25 is a top plan view of a portion of the burner grid of FIGURE 19.

Figure 26:
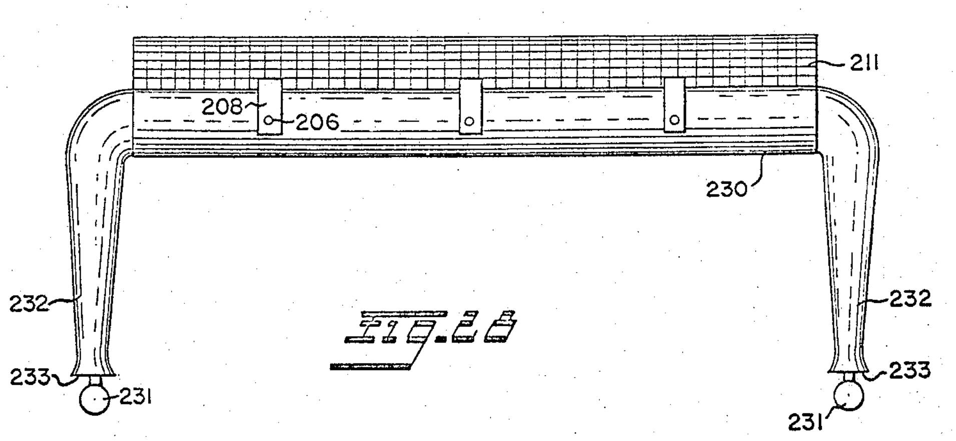

FIGURE 26 is a top plan view of one of the corrugated elements of the grid of FIGURE 25.

Figures 23, 27, 28:
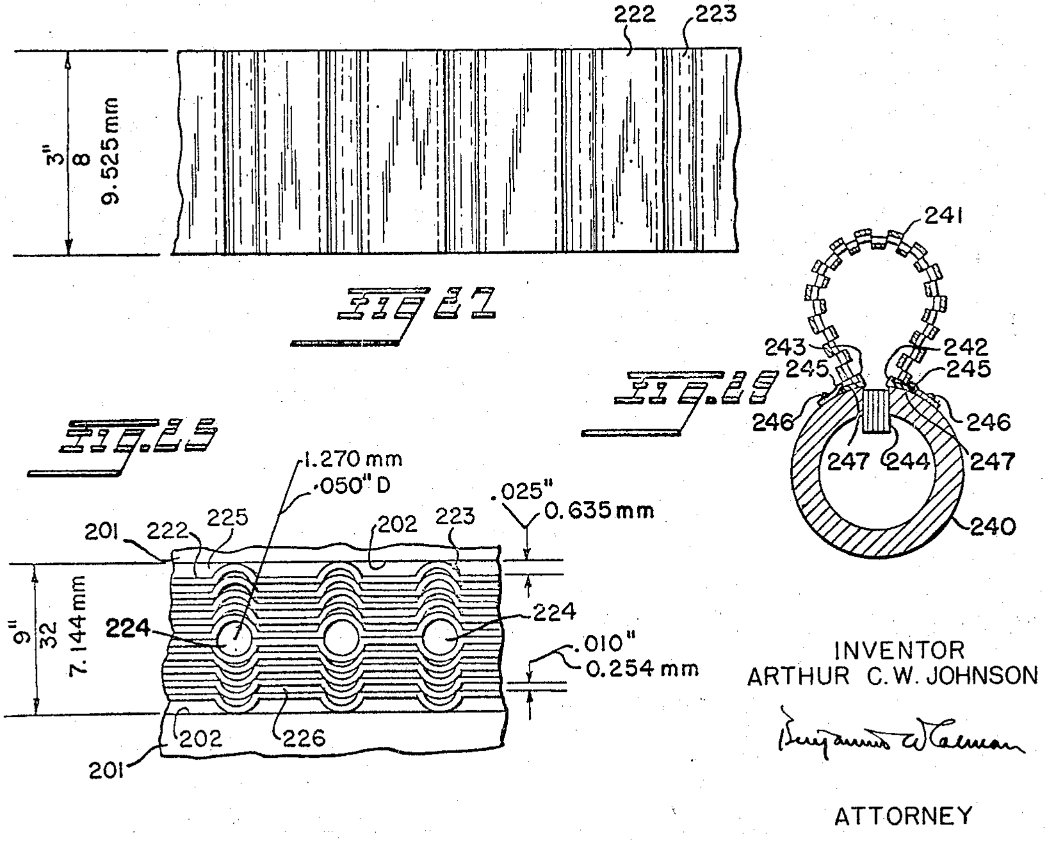

FIGURE 27 is a side view of the element of FIGURE 26.

FIGURE 28 is a view in side elevation of an aspirating type heater with two inlets.

FIGURE 29 is a vertical transverse sectional view through another embodiment of the invention.

FIGURE 30 is a vertical transverse sectional view through another embodiment wherein fuel and combustion air are admitted through separate conduits and ports.

As shown in the several views of the drawing, and with particular reference to FIGURES 1, 2, 3 and 4, the heater or infra-red radiant burner and grid assembly 10 comprises a burner 12 and a radiant grid 14 served with a supply of gaseous fuel.

The gaseous or other fuel is ordinarily premixed with enough air for its complete combustion, various commercial gas-air mixers being available to provide such a mixture.

The burner 12 consists essentially of a conduit or distribution tube for the fuel-air mixture and ports or orifices through which the combustible mixture passes to be burned. This conduit can be in the form of a cylindrical tube 16 as shown, or it can be fashioned in any other suitable form which will conduct or provide a passage way for the fuel from a source to the ports or orifices through the burner wall where it will be ignited and burn as a flame, thus making available the latent heat contained within such fuel. Upon combustion and generation of a flame, the heat generated is transferred by the flame radiation and movement of the hot combustion products to the body of the grid 14 upon which they impinge, the flame gases passing over the inner and outer surfaces of the radiant grid 14, heating these surfaces.

Several forms of a burner are illustrated in the drawings. It will be understood however that such forms are merely indicative of some burners that can be utilized in the invention, and that a number of other burner forms can also be used. Basically a burner is a conduit for fuel gases or other fuel forms that can be ignited at or adjacent an outer surface of the conduit. Gases or other fuel can be discharged from the conduit for combustion through small or large orifices, jets, porous ceramic, elongated slots or slits, fine mesh screens of metal, glass cloth, glass mat material, aluminum oxide woven fabrics, porous sintered metals and numerous other materials. Combustion and flame generation takes place at the outer surface of these burners adjacent the fuel exists.

In the form of the heater illustrated in FIGURES 1 and 2, the conduit 16 is provided with a longitudinally extending slot 18 that is filled with a laminate 20 of fine wire screens relatively closely packed so as to form a tight mesh through which fuel gases pass to the outer surface 21 of the burner. The openings through which the gases emerge at the outer surface of the laminate 20 are very small, much smaller than might be obtained by drilling or piercing the wall of the conduit 16. This wall as illustrated in the drawing is merely a pictorial representation and should not be construed as the preferred thickness of a conduit 16, whose wall may be much thinner or thicker depending upon the particular application for which the heater 10 is designed.

The infra-red radiant grid 14 comprises a metallic body **20*a* having alternating inwardly directed ribs or loops 22 and outwardly directed ribs or loops 24 formed by pushing the metal of the body in opposite directions laterally of the plane of the body and into ribs whose longitudinal ends are integrally connected to the body 20 and whose lateral edges 26 are raised above or depressed below the plane of the body 20*a* so as to provide openings 28 through the body of the grid which are formed by shearing of the metal when the ribs or loops 22 and 24 are formed so that no metal is removed from the grid to make the openings 28. These openings pass the hot gases of the burner 12 through the body and laterally across the outer surface 30 of the inwardly directed ribs 22 and across the inner surface 32 of the outwardly directed ribs 24, the gases also passing through portions 33*a* and 33*b* which are defined by portions of the lateral edges 26 of ribs 22 and 24, respectively and co-operate with openings 28 to form tortuous paths for the gases as they flow through the grid. The hot gases also course over and across the inner surface of the ribs 22 and the outer surface of the ribs 24 as they flow within and without the body 20*a* of the grid 14. The ribs 22 and 24 at the same time provide flame shields at the openings 28, which they cover so that there are no openings normal to the radiating surfaces of the grid and, so that a direct blast of air normal to the surface of the grid is deflected by the ribs and caused to flow longitudinally of the grid, thus preventing flame snuff-out or quenching. The ribs 22 and 24** also have emitting surfaces at least equal in area to the openings 28 through the grid, and the projections of the portions 33*a* and 33*b* defined by the lateral edges 26 of ribs 22 and 24 in a direction normal to the radiant surface of the grid do not subtract from the emitting area. Therefore, the radiant grid has an emitting surface which is at least substantially equal in radiant area to the projected area of the grid. This maximizes the area emitting infra-red radiation from the burner. The radiant grid operates to re-radiate heat acquired from the burner back to the burner surface 21 and the surface of tube 16 within the compass of the grid, where it is retransferred to incoming mixtures of gas and air and in so doing reinforces the heat generated by the gas flame and intensifies combustion. The curved radiant grid also radiates heat inwardly, serving to further heat adjoining and opposite walls thereof.

It will be understood that the grid can also be utilized in planar form as well as in circular form, and can be employed in rectangular arrangements, or in a combination of straight and curved configurations, the illustrated forms being merely representative to certain particular embodiments of the inventive construction. The grid 14 is secured to the burner in any suitable manner and by any suitable means, the embodiments in FIGURES 1, 2 and 4 illustrating longitudinally extending flanges 34 secured to the conduit 16 by rivets 36, or screws, clips, or other suitable fasteners, one edge of the flange over-lying a lateral edge 38 of the radiant grid or radiator at each side thereof. A suitable structure for securing the radiant grid is shown in FIGURES 18 and 19, this structure permitting free expansion and contraction of the lengthwise dimension of the grid.

The burner 16 is normally provided with a cap 40 over its end so as to prevent free escape of the fuel gases passed through it and the radiant grid is normally provided with closures (not shown) at its ends to prevent the escape of hot combustion gases.

In FIGURE 4 there is illustrated a radiant burner 10 charged with fuel gases by a blower unit 42 connected to the burner 12 at its inlet end. This structure permits of pre-mixing fuel gases and air and of discharge of such premixes at higher than normal pressures so as to increase the volume of gases ignited at the burner surface and thus elevate the operating temperature of the heater.

A slightly modified radiant heater 50 is illustrated in FIGURES 5, 6, 7, 8 and 9. In this structure, the burner 52 is substantially the same as the burner 12 except that instead of the closely packed screens 20, the conduit 54 is provided with small orifices 56 through which the fuel gases are discharged for ignition and combustion at the conduit surface 58. The radiator grid 60 is composed of a sheet metal body 62 and outwardly projecting ribs 64 (FIGURES 5, 6 and 7), or inwardly projecting ribs 66 (FIGURE 8), or a combination of inwardly directed ribs 66 and outwardly directed ribs 64 (FIGURE 9) which define channels through which the hot combustion gases will emerge after impingement upon the inner surface 70 of the radiator or radiant grid 60. The hot combustion gases wash the inner and outer surfaces 70 and 72 of the sheet metal body 62 as well as the inner and outer surfaces of the ribs 64 or 66, as the case may be. Thus, heat is transmitted to substantially the entire surface on both sides of the radiator grid 60 effecting re-radiation to the burner 52 and amplification of heat generation as well as radiation outwardly to bodies or surfaces to be heated by the unit 50. As in the case of grid 14, displacement of ribs 64 and/or 66 forms openings 73*a* in the grid; and the lateral edges 73*b* of the ribs define ports 73*c* which communicate with openings 73*a* and co-operate with them to form tortuous paths through the grid for the combustion products. The ribs overlie openings 73*a*, and the projections of ports 73*c* normal to the radiant surface lie interiorly of the lateral edges 73*b* of the ribs so there are no openings through the grid normal to its radiant surface. Therefore the hot gases will course over the ribs as they exit through the grid, maximizing the transfer of heat to them; and the emitting surface of the grid will be substantially equal in radiant area to the projected area of the grid, maximizing the infra-red radiation emitting area of the grid.

As shown in FIGURES 5 and 8, for example, the ribs 64 and 66 may be arranged in parallel rows 73*d* with the ribs in each row opposite the spaces 73*e* in the adjacent rows. The axes of elongation of the ribs (coincident with lines 73*f*) all extend in the same direction in this particular grid, and all of the ribs are displaced to the same side of the grid.

As in the case of grid 14, the grid 60 is provided with lateral flanges 74 for engagement by conduit attached flanges 76 so that the grid radiator is fixed in place. The material for the grid 60 is the same as that for the grid 14. Although the ribs 64 and 66 are shown to be staggered, they can also be arranged in alignment longitudinally and transversely if preferred or required.

The radiant heater of this invention lends itself advantageously to applications for unit heaters in single units or in multiples. A representative embodiment of a compact unit heater is that illustrated in FIGURE 10, in which a radiant heater 80 comprises a burner conduit 82 supporting a heat reflector 84 and a radiant grid assembly 86. The reflector 84 is secured upon the conduit 82 by any suitable means, a ferrule 88 being shown. The conduit is provided with ports or slits 90 for discharge of fuel gases, ignition taking place at the outer areas of the slits, the hot gases being directed radially from the burner for impingement upon the inner surface of the grid 92. The radiant grid assembly 86 comprises the grid 92, end plates 94, 96 closing off the open ends of grid 92 which is in substantially circular form, and ferrules or collars 98 that secure the end plates to the burner conduit 82. A conduit cap or plug 100 closes the burner against free escape of fuel gases except through the slits 90. The grid construction is substantially the same as that of grid 14 above described.

An illustration of a representative example of a radiant heater employing a porous ceramic burner is that shown in FIGURE 11, in which the heater 110 comprises an outer housing 112, a conduit 114 passing fuel gases to the housing chamber 116, a porous ceramic block 118 through which the fuel gases are passed to the flame surface 120 where these gases are ignited and burn, and a grid 122 of substantially the same construction as grids 14 and 92 although arranged in planar instead of circular form. The grid 122 is mounted so as to lie flat against the surface 120 of the block 118 or slightly spaced therefrom as in FIGURE 11. The radiant heater 110 can be utilized as a single unit or in a battery of such units. The radiant heater 110 is adapted to heat stationary planar surfaces or continuously moving planar sheet material 124.

The radiant heater 130, FIGURE 13, utilizes a burner 132 having a fuel gas conduit 134 and jets 136 projecting from the conduit at spaced intervals and from which issue flames and gases that impinge upon the grid 138, of substantially the same construction as that of grids 14 and 92, secured at its lateral edges to the opposing side walls 140 by spaced members 142 secured by welding or other suitable means to the conduit body and to the side walls. An air supply filter screen can be made of screen wire or other conventional screening, or it can be made in the side walls 140 by perforating the walls with openings 144 through which air can be drawn to serve and provide some or all of the air for the combustion of fuel at the jets 136. A closure or cap 146 is applied to the end of the burner 132. Although grid 138 is shown open at its ends, in some instances it may be desirable to close the ends in which case a solid plate or a closure formed of the grid material 138 can be attached in any suitable manner.

Another arrangement embodying the inventive construction for heating continuously moving or flowing sheet material is illustrated in FIGURES 14 and 15, in which each radiant heater unit 150 comprises a burner 152, substantially the same as burner 12 of FIGURE 2 or the burner of FIGURE 19 so that the flame and combustion gases are directed toward the sheet material 154 to be heated, grid radiator sheets 156 projecting laterally adjacent the jets 157 and secured to bracket members 158 by fasteners supported by the burners 152, and a conduit 160 supplying fuel gases to the burners 152, the supply to each burner being controlled by a valve 162.

In the radiant heater illustrated in FIGURES 14 and 15, the grid sheets 156 have a first planar portion 164 arranged parallel to the plane of sheet material 154 and a second planar portion 166 directed upwardly at an angle to the plane of portion 164. Convective impingement of the flame gases issuing from burners 152 upon the continuously moving sheet material 154 is directed back to grid portions 164 from which they are re-radiated to the sheet material and then to and through the grid portion 166 operating as a secondary radiator or reflector, passing away as waste gases between the grids of the heater units 150.

A most difficult heating problem is one which involves or requires the heating of industrial rolls or strip having a highly polished and reflective surface. Such rolls are used for polishing and rolling of metals, paper, plastics or other sheet material passed in a continuous flowing fashion through and between a pair of such rolls. Direct radiation alone limits the ability to efficiently heat such rolls or sheets. It is very desirable in such a situation to apply and obtain a maximum convective effect. This can be accomplished by placing the work between primary and secondary grids, thus obtaining maximum convective action prior to secondary radiation. In FIGURES 16 and 17 is illustrated a radiant heater construction which can more efficiently heat the highly polished surface of a roll by utilizing a burner and the grid structure of this invention.

The radiant heater unit 170 comprises a burner conduit 172 having flame jets 174 issuing from the conduit, and a pair of grids 176 disposed on either side of the jets and secured to the burner conduit 172 by members 178. The burner conduit 172 encircles a portion of the circumference of the roll 180 and the flame and flame gases from the jets 174 impinge directly upon the surface 182 of the roll, from which surface they are reflected or deflected to the grid structures 176 which radiate heat back to the roll surface 182, the gases finally passing through and between adjacent grid structures. In this arrangement primary radiation is initially generated within and by the flame gases which strike directly upon the roll surface, while simultaneously imparting heat energy by convection, then bouncing off the roll surface to the adjacent radiant grids 176 forming the secondary radiators. In order to avoid the cutting and piecing which would be necessary to bend the grids 176 from a flat grid to one having the double curvature of FIGURES 16 and 17, the grid could be bent with only a single curvature to encircle the roll 180, in which case the grid sections of FIGURE 16 appear straight rather than bent upwardly at their outer portions. A battery or multiples of the heater unit 170 are arranged substantially in parallel relation longitudinally of and peripherally about a portion of the roll 180. To control the flow of fuel to the burner conduit 172 a valve 184 is disposed in conduit 186 leading from the fuel supply conduit 188 that serves all of the heater units 170.

Although the circular heater units 170 are disposed transversely of the roll, it will be understood that straight heater units can be disposed longitudinally and radially of the roll to perform the same function of heating the roll surface 182. The structure illustrated in FIGURES 16 and 17 discloses a heater unit designed to heat the outer surface 182 of the roll 180. The heater unit, when inverted so that the jets are disposed radially outwardly and the grids 176 are outwardly adjacent the jets, can also be used internally of the roll to heat the roll from its inner surface. The roll 180 and its complementary roll 190, roll the material 192 therebetween under heat and pressure.

In the embodiment of FIGURES 18 and 19 a burner tube 201 is provided with a longitudinal slot 202 which receives an elongated orifice grid 203, shown in detail in FIGURES 25 to 27. A series of pins 204 passing through the tube 201 and the grid 203 holds the grid in place in the slot. The grid is also secured by the clamping action of the sides of the slot 202 in the burner tube 201 when a nut 205 is tightened on a bolt 206 passing diametrically through the tube below the slot 202. A series of such bolts 206 along the length of the burner tube 201 also clamp pairs of inner and outer mounting brackets 207 and 208 which removably secure a radiant grid 211 in place over the longitudinal orifice grid 203 in a manner to be described.

The radiant grid 211 is formed from a sheet of metal 212 shown in FIGURES 20 to 22. The sheet of metal 212 has spaced rows of alternately downwardly depressed and upwardly extending rounded projections or corrugated ribs 213 and 214 on opposite sides of shear lines 215 formed in the sheet 212 when the projections 213 and 214 are formed. The metal forming the projections or ribs is slightly stretched and consequently a little thinner than the remaining flat portions 216 between the rows of projections.

The grid may be bent along one axis of a U-shape such as shown in FIGURES 23 and 24 or it may be bent along a second axis to the shape shown in FIGURE 19. When bent as in FIGURE 19 the radiant grid securing means shown in FIGURES 18 and 19 may be used. As shown in FIGURE 19 each inner mounting bracket 207 has an inwardly extending portion 217 which terminates in an upwardly extending portion 218. At least the bottom row of depressed ribs rests against the outer side of the bracket portion 218. The outer mounting bracket 208 terminates at its upper end in an inwardly directed leg 220 that engages the upper edges of the lowermost row of raised ribs 214. Each edge of the radiant grid 211 is thus gripped by a pair of inner and outer mounting brackets 207 and 208 at suitably spaced points along the length of the grid. The grip is sufficiently loose to permit lengthwise expansion and contraction of the grid, yet secures the grid against transverse displacement. Removal and replacement of the radiant grid is by loosening the nuts 205 on the bolts 206 until all the mounting brackets 208 are loose and can be disengaged from the grid. The old grid is removed and a new one inserted. To prevent gas leaks where the bolts 206 pass through the burner tube 201 suitable gaskets, not shown, surround the bolts 206 between the tube 201 and the inner mounting brackets 207. Alternatively, the radiant grid may be removed and replaced by sliding it lengthwise through the mounting brackets, the grips of the brackets being sufficiently loose to permit this. In such case of course the nut 205 and bolt 206 need not be loosened. Also, each pair of mounting brackets 207 and 208 may be spot welded together.

One form of an elongated orifice grid which has been found satisfactory is that referred to by reference numeral 203, a portion being shown in enlarged detail in FIGURES 25, 26 and 27. It is composed of a series of sheets of metal having spaced corrugations. Each sheet 222 has a series of parallel spaced corrugations 223 projecting upwardly (in FIGURE 26) in the same direction. The grid is formed by placing a number of sheets 222 against each other with the corrugations 223 nested in each other as shown in FIGURE 25. This makes the individual sheets closer together than if the corrugations were not so nested. For example in the grid of FIGURE 25 the sheets 222 are spaced 0.01 inch (0.254 mm.) apart whereas if the corrugations were not nested the spacing would be 0.025 inch (0.625 mm.).

Also, in the orifice grid of FIGURE 25 half of the sheets 222 face in one direction, then at the centerline of the grid the sheets are reversed and the remaining ones face in the other direction. The two central sheets 222 both have their corrugations facing outwardly. Thus their flat portions are in full contact and the paired outwardly facing corrugations form a series of spaced substantially circular orifices.

As described in FIGURE 19 the corrugated sheets 222 forming the orifice grid 203 are clamped between the walls of the slot 202 in the burner tube 201. The entire assembly results in groups of orifices of different sizes. For example, in the grid of FIGURE 25 wherein the sheets 222 are 0.015 inch (0.381 mm.) thick the substantially circular orifices 224 along the centerline are 0.050 inch (1.270 mm.) in diameter. The elongated orifices 225 between the outermost sheets 222 and the edge of the slot are 0.025 inch (0.635 mm.) wide and about three sixteenths of an inch (4.763 mm.) long. The narrowest orifices 226 between adjoining nested sheets 222 are 0.010 inch (0.254 mm.) wide and three sixteenths of an inch (4.763 mm.) wide. All the orifices are three eighths of an inch (9.525 mm.) deep, this being the width of the sheets 222.

In the grid illustrated these dimensions result in a large total orifice area but with a high ratio of individual orifice length (or depth) to individual orifice cross-sectional area to permit the flow of a large volume of fuel and combustion air mixture to provide the high output that must be delivered by the burner grid and still prevent flashback into the burner tube 201. As mentioned before, the tendency to backfire is enhanced because the mixture passing through the orifice grid is much more combustible than if only fuel were passing through the grid, and it is also much greater in volume. The backfire tendency is also increased because of the very high temperature in the combustion space between the orifice grid 203 and the radiant grid 211 which is in close proximity to the orifice grid. While they are narrow or of small cross-sectional area with respect to their depth to prevent backfire of the combustible mixture, the orifices are of sufficient number to supply the required amount of combustible mixture and permit a velocity through the burner tube 201 high enough to keep it cool and well below the ignition temperature of the mixture. The aforementioned dimensions of the orifice grid 203 are substantially pertinent to one where the radiant grid 211 of FIGURE 19 has a curvature with a radius of approximately 0.75 inch (19.05 mm.) and a total height from the inwardly extending portions of inner mounting brackets 207 to the top of the grid of approximately 1.50 inches (38.10 mm.). The width of the orifice grid 203 as determined by the width of the slot 202 is nine thirty-seconds of an inch (7.144 mm.). Greater volumetric capacity of the orifice grid 203 for the same internal pressure within burner tube 201 is attained by increasing the width of the burner tube slot 202 and increasing the number of corrugated sheets 222 to fill the slot. The sheets 222 forming the burner grid orifices are preferably made of high temperature and corrosion resistant steel.

Dimensions of the projections and depressions of the radiant grid sheet 212, before being curved as in FIGURE 19 to form the radiant grid 211, are shown in FIGURES 21 and 22. It is formed of 26 gauge (0.45 mm. thick) Inconel.

While the preceding description, with the exception of that of FIGURE 13, has pertained to a construction wherein a mixture of fuel and combustion air is fed under pressure to a burner tube such as 201 of FIGURES 1, 4 and 19, it is equally pertinent to a construction as illustrated in FIGURE 28 where the burner tube 230 is fed with a mixture of fuel from fuel supply lines 231 which discharge fuel under pressure into a number of spaced venturi tubes 232 which aspirate all required combustion air through adjustable aspirating openings 233 of well known type at the entrances of the venturi tubes. In such constructions the internal pressure of the air and fuel within the burner tube 230 is less than when the burner tube is supplied with a premixture of air and fuel under a blower or other pressure as in FIGURE 4, etc. Consequently wider longitudinal slots and orifice grids along the length of the burner tube 230 are required than is the case for example for the heater of FIGURES 18 and 19. The wider width of the orifice grids is attained by increasing the number of corrugated sheets 222 of FIGURE 26 to fill the wider slot.

Because of the relatively low pressure of the mixture of fuel and aspirated air in the burner tube 230 two venturi tubes 232 are used to feed the burner tube at its two ends, to reduce the effect of pressure drop of the mixture within the burner tube at points spaced away from the venturi tubes 232. Where the burner tube 230 is sufficiently long from end to end, it is within the province of the invention to add aspirating venturi tubes 232 along its length so that the fuel air mixture is supplied at a substantially equal pressure along the length of the burner orifice grid.

Also, in an aspirated air heater as illustrated in FIGURE 28 the downwardly depressed and raised projections 213 and 214 of the radiant grid 211 shown in FIGURES 18 to 22 are larger than the example shown in these FIGURES 18 to 22 in order to provide larger openings at the shear lines 215 to reduce internal pressure of the hot combustion gases between the radiant grid and the orifice grid and consequently reduce the pressure required to force the mixture of fuel and combustion air through the burner orifice grid. The radiant grid 211 of FIGURE 28 is preferably secured to the burner tube 230 by the structure shown in FIGURES 18 and 19, including the bolts 206 and inner and outer mounting brackets 207 and 208 of FIGURES 18 and 19, only the outer mounting brackets 208 being visible in FIGURE 28.

In FIGURE 29 is shown a construction wherein the exposure of the burner tube 240 to the heat of the hot flame and combustion products within the radiant grid 241 is reduced by mounting the longitudinal edges 242 and 243 of the radiant grid closely adjacent the sides of an orifice grid 244, which in the embodiment shown is the ribbon type orifice grid shown in FIGURES 19 and 25, although it is to be understood that this embodiment is applicable to any burner construction where the burner orifices are in one longitudinal area or zone of the burner tube 240.

In FIGURE 29 the radiant grid 241 which is otherwise similar to that shown in FIGURES 1, 2, 18 and 19 is shown secured to the burner tube 240 by longitudinally extending flanges 245 affixed to the burner tube as by rivets 246, one edge of each flange 245 overlying a projecting lateral edge 247 of the radiant grid 241 at each side thereof, in the manner shown in FIGURES 1, 2, 5 and 6. As in those figures, the flanges 245 permit longitudinal expansion and contraction of the radiant grid.

The reduction of the exposure of the surface of the burner tube 240 to the hot flame and hot combustion products within the radiant grid 241 as compared to the exposure in FIGURES 1, 2, 5, 6, 18 and 19 etc. results in a substantial increase in the efficiency of the infra-red radiant heater and reduces the possibility of backfire through the orifice grid 244 into the burner tube 240. This is particularly important in heater installations which result in high ambient temperatures around the radiant grid and burner tube.

Another embodiment of my invention is illustrated in FIGURE 30, wherein the fuel and combustion air are not premixed before admission into the combustion space within the radiant grid that encloses the combustion space, but are admitted separately under pressure into the combustion space from the burner tube which includes separate conduits for the fuel and for the combustion air, discharging combustion air through one set of orifices, and fuel, such as gas or any of the previously mentioned fuels through another set of orifices. In this embodiment the possibility of backfire into the burner tube is completely avoided, because there is not a combustible mixture either in the fuel conduit or the air conduit.

As shown in FIGURE 30 the burner tube generally designated by the reference number 250 comprises an external combustion air pipe 251 having a co-aligned fuel pipe 252 arranged longitudinal along the external combustion air pipe 251 at a peripheral portion thereof, and affixed at this peripheral portion as by welding or the like. The combustion air pipe 251 has a longitudinal slot to receive the fuel pipe 252, or as is obvious, the fuel pipe 252 may be U or otherwise shaped and welded to the pipe 251 with its common wall 253 perforated as by orifices 254 for the admission of gaseous or other fuel into the combustion space 255 within the radiant grid 256. Adjacent and alongside the outsides of the junctures of the fuel pipe 252 and the combustion air pipe 251, the combustion air pipe 251 has a longitudinal series of orifices 257 for admission of combustion air from the combustion air pipe 251 to the combustion space 255 within the radiant grid 256. These orifices 257 may be, but are not necessarily in the same transverse planes as the orifices 254 for the fuel from the fuel pipe 252.

In FIGURE 30 the radiant grid 256 is shown attached to the burner tube 251 in the same manner as the embodiments of FIGURES 1, 2, 5 and 6 and the description thereof is not repeated here.

In the embodiment of FIGURE 30, not only is the possibility of backfire into the burner tube eliminated because there is no combustible mixture of air and fuel in the burner tube 250, but also the temperature of the fuel pipe 252 is reduced by the cooling effect of the combustion air in the combustion air pipe 251 which almost surrounds the fuel pipe 252.

The temperatures for which the radiant heater has been designed, when natural gas is used without forced air, is in the range of from about 1000° F. to about 2100° F. For heaters with forced air-gas premixes the radiant heaters are designed to operate in the range of from about 1000° F. to about 2700° F.

The heaters herein disclosed can be used without reflectors; but, as is well known in the art, reflectors are often desirable to focus the heat radiated from the radiant grids, reducing the heat dissipation to bodies or surfaces which it is not desired or required to heat and confining the heat to surfaces and bodies for which the installation was designed.

The radiant grids herein disclosed can take any of the several forms shown and described although the form shown in FIGURES 20 to 22 wherein the depressed and raised projections 213 and 214 are substantially circular in cross-section is preferred. These grid structures in each instance embody a grid body having openings therethrough defined by shear lines which in turn define shields for the openings formed laterally outwardly and/or inwardly of the grid body, the opening being disposed in planes substantially normal to the plane of the grid body. They each contain a relatively large number of shielded openings, and these openings are of a total area that will pass a relatively large volume of hot gases therethrough directing them along the surface of the radiant grid in a direction parallel to the axes of the curved projections and/or depressions. Where the grid is curved as in FIGURES 6 and 23 the hot gases are discharged parallel to the axis of the radiant grid as well as to the axes of the projections. If the area of the grid openings is reduced individually and/or collectively to a degree or magnitude such that the flow of gases of combustion, which carry the heat, is substantially impeded in their passage through the radiant grid body, then in such event the flow of combustion gases will be choked off due to insufficient port area, causing low gas combustion and a drop in temperature output. In a constant pressure system such as is here described for the radiant heater of this invention, the radiant grid port area is related directly to the efficiency of the heater. If is therefore essential that the area and number of grid openings be such that the hot combustion gases flow freely therethrough, while maintaining an effective distribution of such gases throughout the operating and functioning area of the burner orifice grid and the radiant grid.

Although not deemed essential, it is preferred that the radiant grid openings be substantially of the same size in order that the heat of the hot combustion products be relatively uniformly distributed across the surface of the radiant grid body which will then produce a relatively uniform temperature heating surface. Where hot spots of higher temperature occur, decomposition and overheating of such localized area hasten and accelerate the destruction of the radiant grid.

Recognizing these factors, persons skilled in the art to which the invention pertains will understand that the radiant grid openings are variable depending upon the particular application for which the heater is required. The volume and flow rate of fuel gases to maintain required temperatures will play a leading role in the determination of radiant grid opening areas. Such required areas may be provided by increasing or decreasing the number of openings through the grid body, with the understanding that a fewer number of openings of substantially excessive area can result in a material loss of heat and energy through too rapid dissipation of the hot combustion gases, and that an insufficient number of grid openings may result in inefficient operation of the heater.

Another feature of the radiant grid structures of this invention is that in the forms illustrated the laterally deformed projections or shields, whether inwardly and/or outwardly directed, are formed from the grid body without loss of metal. That is, no metal is removed in the production of the grid structure and in fact the surface area is increased. The laterally deformed opening shields or projections may be arranged in staggered patterns or in aligned patterns, as described and illustrated, or in other preferred or required patterns depending upon the application for which the heater is designed. The planes of the radiant grid openings, formed along the shear lines defining the ends of the shields or projections are substantially normal to the plane of the grid body.

It will further be recognized that the radiant grid structures of this invention forms a combustion chamber with the burner tube whereby the flame and hot gases of combustion flow in various paths and courses between the burner orifice grid and the radiant grid structure. The flow of hot combustion gases and the radiant heat from the flame are the means by which the radiant grid is heated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In an infra-red radiant heater of the combustion type:

(a) means forming a walled fuel-air mixture distribution chamber for a combustible mixture of fuel and air;

(b) said distribution chamber having means for distributing the fuel-air mixture to a combustion zone adjacent said distribution chamber so as to maintain the region of said wall adjacent said combustion zone at a non-incandescent temperature;

(c) a deterioration resistant, apertured radiant grid which is the primary burner component adapted to be heated to incandescence by the combustion of the fuel-air mixture in the combustion zone adjacent said distribution chamber;

(d) said grid overlying the region of the distribution chamber in which said combustible mixture distributing means are provided and the combustion zone for the mixture issuing from said means;

(e) said grid further surmounting said combustion zone so that said combustion zone lies substantially within the compass of said grid and said grid provides outlets for combustion products generated in said combustion zone;

(f) the region of said grid through which said combustion production products pass from said combustion zone being substantially coextensive in length with said combustion zone so that said radiant grid is heated by combustion of the fuel-air mixture in said combustion zone and the radiant energy and sensible heat in the combustion gases formed in said combustion zone are substantially uniformly imparted to said radiant grid;

(g) said radiant grid being fabricated of heat resistant material having imperforate ribs displaced therefrom to provide openings through the grid, the outer surfaces of said ribs extending generally parallel with the plane of the grid and serving to deflect laterally and away therefrom any air currents moving substantially normal to said plane, said ribs being so located that there are no openings through the grid normal to the radiant surface whereby said radiant grid has an emitting surface which is substantially equal in radiant area to the projected area of the grid so as to maximize the area emitting infra-red radiation from the burner;

(h) the lateral edges of said ribs defining ports which communicate with the aforementioned openings through the grid to form tortuous paths for the flow of combustion products through said grid, the edges of said ribs being so located that the projected areas of said ports normal to the radiant surface are interiorly of said ribs;

(i) whereby the hot combustion gases formed in said combustion zone will course over the ribs of said grid as they are exhausted from said combustion zone through said grid to maximize the transfer of heat from said gases to said grid.

2. The infra-red radiant heater structure of claim 1 wherein said combustible mixture distribution means comprises a series of elongated sheets having spaced parallel corrugations, (a) the corrugations of at least some adjoining sheets being nested in each other, (b) and the wall of said supply chamber having a slot therethrough to snugly receive a group of said corrugated sheets.

3. The infra-red radiant heater structure of claim 1 wherein said combustible mixture distribution means comprises a series of at least four elongated sheets having spaced parallel substantially semi-circular corrugations, (a) the corrugations of the central pair of sheets facing outwardly in opposite directions in the same transverse planes whereby the flat portions of the sheets abut each other and the paired corrugations form substantially circular passageways, (b) the corrugations of the remaining sheets on either side of the central pair being nested in each other to provide narrow substantially rectangular passageways, (c) and the wall of said supply chamber having a slot to snugly receive a group of said corrulated sheets.

4. The infra-red radiant heater of claim 1 wherein said combustible mixture distribution means comprises a laminate of closely packed fine wire screens all perpendicular to the wall of said supply chamber, (a) and the wall of said supply chamber having a slot therethrough snugly gripping said laminate.

5. The radiant heater of claim 1, wherein the ribs of the radiant grid have a uniform and arcuate cross-sectional configuration, whereby there are generally normal ports defined by said ribs at both lateral edges of each of said ribs, and wherein the ribs are arranged in parallel spaced apart rows, successive ribs in each of said rows being displaced on opposite sides of the grid and the ribs being so oriented that the axes of elongation of all said ribs lie in parallel planes.

6. The heater of claim 1, together with means for supplying the combustible fuel-air mixture to the distribution tube, which comprise:

(a) plural venturi tubes spaced along and communicating with said distribution tube at their outlet ends;

(b) a fuel supply line communicating with the inlet ends of said venturi tubes for supplying a fluid fuel thereto, and (c) means forming atmospheric air aspirating openings at the inlet ends of said venturi tubes;

(d) whereby the fuel supplied to each said venturi tube will induce air therein and become mixed with said air as it flows through the venturi tube to form the combustible fuel-air mixture for the burner.

7. In an infra-red radiant heater of the combustion type:

(a) means forming a walled fuel-air mixture distribution chamber for a combustible mixture of fuel and air;

(b) said distribution chamber having means for distributing the fuel-air mixture to a combustion zone adjacent said distribution chamber so as to maintain the region of said wall adjacent said combustion zone at a non-incandescent temperature;

(c) a deterioration resistant, apertured radiant grid which is the primary burner component adapted to be heated to incandescence by the combustion of the fuel-air mixture in the combustion zone adjacent said distribution chamber;

(d) said grid being bent around an axis parallel to the major dimension of the distribution chamber and overlying the region of the distribution chamber in which said combustible mixture distributing means are provided and the combustion zone for the mixture issuing from said means;

(e) said grid further surmounting said combustion zone so that said combustion zone lies substantially within the compass of said grid and said grid provides outlets for combustion products generated in said combustion zone;

(f) the region of said grid through which said combustion products pass from said combustion zone being substantially coextensive in length with said combustion zone so that said radiant grid is heated by combustion of the fuel-air mixture in said combustion zone and the radiant energy and sensible heat in the combustion gases formed in said combustion zone are substantially uniformly imparted to said radiant grid;

(g) said radiant grid being fabricated of heat resistant material having imperforate ribs displaced therefrom to provide openings through the grid, the outer surfaces of said ribs extending generally parallel with the plane of the grid and serving to deflect laterally and away therefrom any air currents moving substantially normal to said plane, said ribs being so located that there are no openings through the grid normal to the radiant surface whereby said radiant grid has an emitting surface which is substantially equal in radiant area to the projected area of the grid so as to maximize the area emitting infra-red radiation from the burner;

(h) the lateral edges of said ribs defining ports which communicate with the aforementioned openings through the grid to form tortuous paths for the flow of combustion products through said grid, the edges of said ribs being so located that the projected areas of said ports normal to the radiant surface are interiorly of said ribs;

(i) whereby the hot combustion gases formed in said combustion zone will course over the ribs of said grid as they are exhausted from said combustion zone through said grid to maximize the transfer of heat from said gases to said grid.

8. The infra-red radiant heater of claim 7 wherein the ribs of the radiant grid are all parallel to the axis around which the radiant grid is bent, whereby the combustion gases issuing from the ports defined by the lateral edges of the ribs flow axially over the adjoining surfaces of the grid.

9. The infra-red radiant heater of claim 7, wherein the ribs of the radiant grid are all perpendicular to the axis around which the radiant grid is bent, whereby the combustion gases issuing from the ports defined by the lateral edges of the ribs flow tangentially over adjoining surfaces of the grid.

10. In an infra-red radiant heater of the combustion type:

(a) means forming a walled fuel-air mixture distribution chamber for a combustible mixture of fuel and air;

(b) said distribution chamber having means for distributing the fuel-air mixture to a combustion zone adjacent said distribution chamber so as to maintain the region of said wall adjacent said combustion zone at a non-incandescent temperature, said distributing means including a burner orifice grid comprising a laminate of ribbons having spaced parallel corrugations seated in a slot in said distribution tube wall with the corrugations in said ribbons perpendicular to the axis of said distribution tube;

(c) a deterioration resistant, apertured radiant grid which is the primary burner component adapted to be heated to incandescence by the combustion of the fuel-air mixture in the combustion zone adjacent said distribution chamber;

(d) said grid overlying the region of the distribution chamber in which said combustible mixture distributing means are provided and the combustion zone for the mixture issuing from said means;

(e) said grid further surmounting said combustion zone so that said combustion zone lies substantially within the compass of said grid and said grid provides outlets for combustion products generated in said combustion zone;

(f) the region of said grid through which said combustion products pass from said combustion zone being substantially coextensive in length with said combustion zone so that said radiant grid is heated by combustion of the fuel-air mixture in said combustion zone and the radiant energy and sensible heat in the combustion gases formed in said combustion zone are substantially uniformly imparted to said radiant grid;

(g) said radiant grid being fabricated of heat resistant material having imperforate ribs displaced therefrom to provide openings through the grid, the outer surfaces of said ribs extending generally parallel with the plane of the grid and serving to deflect laterally and away therefrom any air currents moving substantially normal to said plane, said ribs being so located that there are no openings through the grid normal to the radiant surface whereby said radiant grid has an emitting surface which is substantially equal in radiant area to the projected area of the grid so as to maximize the area emitting infra-red radiation from the burner:

(h) the lateral edges of said ribs defining ports which communicate with the aforementioned openings through the grid to from tortuous paths for the flow of combustion products through said grid, the edges of said ribs being so located that the projected areas of said ports normal to the radiant surface are interiorly of said ribs;

(i) whereby the hot combustion gases formed in said combustion zone will course cover the ribs of said grid as they are exhausted from said combustion zone through said grid to maximize the transfer of heat from said gases to said grid;

(j) a series of bolts passing substantially diametrically through said distribution tube wall and perpendicular to said burner orifice grid to compress said burner orifice grid between the edges of the slot in the distribution tube wall; and (k) fastening means carried by said series of bolts securing the radiant grid to the distribution tube substantially at the edges of the radiant grid.

11. In an infra-red radiant heater of the combustion type:

(a) means forming a walled fuel-air mixture distribution chamber for a combustible mixture of fuel and air;

(b) said distribution chamber having means for distributing the fuel-air mixture to a combustion zone adjacent said distribution chamber so as to maintain the region of said wall adjacent said combustion zone at a non-incandescent temperature, said distributing means comprising a porous ceramic block forming the region of the distribution tube wall adjacent the combustion zone;

(c) a deterioration resistant apertured, radiant grid which is the primary burner component adapted to be heated to incandescence by the combustion of the fuel-air mixture in the combustion zone adjacent said distribution chamber;

(d) said grid overlying the region of the distribution chamber in which said combustible mixture distributing means are provided and the combustion zone for the mixture issuing from said means, (e) said grid further surmounting said combustion zone so that said combustion zone lies substantially within the compass of said grid and said grid provides outlets for combustion products generated in said combustion zone;

(f) the region of said radiant grid through which said combustion products pass from said combustion zone being substantially coextensive in length with said combustion zone so that said radiant grid is heated by combustion of the fuel-air mixture in said combustion zone and the radiant energy and sensible heat in the combustion gases formed in said combustion zone are substantially uniformly imparted to said radiant grid;

(g) said radiant grid being fabricated of heat resistant material having imperforate ribs displaced therefrom to provide openings through the grid, the outer surfaces of said ribs extending generally parallel with the plane of the grid and serving to deflect laterally and away therefrom any air currents moving substantially normal to said plane, said ribs being so located that there are no openings through the grid normal to the radiant surface whereby said radiant grid has an emitting surface which is substantially equal in radiant area to the projected area of the grid so as to maximize the area emitting infra-red radiation from the burner;

(h) the lateral edges of said ribs defining ports which communicate with the aforementioned openings through the grid to form tortuous paths for the flow of combustion products through said grid, the edges of said ribs being so located that the projected areas of said ports normal to the radiant surface are interiorly of said ribs;

(i) whereby the hot combustion gases formed in said combustion zone will course over the ribs of said grid as they are exhausted from said combustion zone through said grid to maximize the transfer of heat from said gases to said grid.

12. A heating system for cylindrical rolls and the like, comprising:

(a) a plurality of infra-red generators of the combustion type, each of which includes:

(b) means forming a walled fuel-air mixture distribution chamber for a combustible mixture of fuel and air;

(c) said distribution chamber having means for distributing the fuel-air mixture to a combustion zone adjacent said distribution chamber so as to maintain the region of said wall adjacent said combustion zone at a non-incandescent temperature;

(d) a deterioration resistant, apertured radiant grid which is the primary burner component adapted to be heated to incandescence by the combustion of the fuel-air mixture in the combustion zone adjacent said distribution chamber;

(e) said grid overlying the region of the distribution chamber in which said combustible mixture distributing means are provided and the combustion zone for the mixture issuing from said means;

(f) said grid further surmounting said combustion zone so that said combustion zone lies substantially within the compass of said grid and said grid provides outlets for combustion products generated in said combustion zone;

(g) the region of said radiant grid through which said combustion products pass from said combustion zone being substantially coextensive in length with said combustion zone so that said radiant grid is heated by combustion of the fuel-air mixture in said combustion zone and the radiant energy and sensible heat in the combustion gases formed in said combustion zone are substantially uniformly imparted to said radiant grid;

(h) said radiant grid being fabricated of heat resistant material having imperforate ribs displaced therefrom to provide openings through the grid, the outer surfaces of said ribs extending generally parallel with the plane of the grid and serving to deflect laterally and away therefrom any air currents moving substantially normal to said plane, said ribs being so located that there are no openings through the grid normal to the radiant surface whereby said radiant grid has an emitting surface which is substantially equal in radiant area to the projected area of the grid so as to maximize the area emitting infra-red radiation from the burner;

(i) the lateral edges of said ribs defining ports which communicate with the aforementioned openings through the grid to form tortuous paths for the flow of combustion products through said grid, the edges of said ribs being so located that the projected areas of said ports normal to the radiant surface are interiorly of said ribs;

(j) whereby the hot combustion gases formed in said combustion zone will course over the ribs of said grid as they are exhausted from said combustion zone through said grid to maximize the transfer of heat from said gases to said grid;

(k) said infra-red generators being so disposed that the radiant grids of said generators are parallel and arranged in an array having a generally arcuate configuration.

13. The heating system of claim 12, wherein there are two grids for and extending substantially the length of each of said supply chambers, the grids of each infra-red generator being disposed on the opposite sides of the region of the associated supply chamber in which the combustible mixture disturbing orifices are formed.

14. In an infra-red radiant heater, (a) burner means comprising a burner tube providing a combustible mixture of fuel and air for combustion adjacent a surface portion of said burner tube, (b) a radiant grid disposed adjacent but spaced from said surface portion of the burner tube, extending laterally away from said surface portion, (c) and reflectors for said radiant grid disposed laterally of and substantially parallel with said radiant grid, (d) said radiant grid and said reflectors each being formed of a sheet of heat resistant material having passages therethrough and imperforate ribs displaced therefrom and substantially completely overlying said passages to thereby provide said grid and said reflectors with emitting and reflecting surfaces which are substantially equal in area to the total area of the sheets from which said grid and said reflectors are formed, (e) peripheral portions of said ribs being so spaced from said sheets as to provide passages between said ribs and said sheets which are generally normal to said sheets and communicate with the passages through said sheets, (f) whereby the hot combustion gases formed in the combustion zone of said burner will wipe over the ribs of said grid and said reflectors as they are exhausted from said combustion zone through the passages in the sheets from which said grid and said reflectors are formed and the passages between said sheets and the ribs formed therefrom, thereby maximizing the transfer of heat from the combustion gases to said grid and said reflectors.

15. In the infra-red heater of claim 14, (a) a plurality of similar burner tubes, radiant grids and reflectors all arranged in parallel relationship, (b) and a conduit forming a supply manifold connected to all of said burner tubes to supply a combustible mixture of fuel and air thereto.

16. In an infra-red radiant heater of the combustion type:

(a) means forming a walled fuel-air mixture distribution chamber for a combustible mixture of fuel and air;

(b) said distribution chamber having means for distributing the fuel-air mixture to a combustion zone adjacent said distribution chamber so as to maintain the region of said wall adjacent said combustion zone at a non-incandescent temperature;

(c) a deterioration resistant, apertured radiant grid which is the primary burner component adapted to be heated to incandescence by the combustion of the fuel-air mixture in the combustion zone adjacent said distribution chamber;

(d) said grid overlying the region of the distribution chamber in which said combustible mixture distributing means are provided and the combustion zone for the mixture issuing from said means;

(e) said grid further surmounting said combustion zone so that said combustion zone lies substantially within the compass of said grid and said grid provides outlets for combustion products generated in said combustion zone;

(f) the region of said grid through which said combustion production products pass from said combustion zone being substantially coextensive in length with said combustion zone so that said radiant grid is heated by combustion of the fuel-air mixture in said combustion zone and the radiant energy and sensible heat in the combustion gases formed in said combustion zone are substantially uniformly imparted to said radiant grid;

(g) said radiant grid being fabricated of heat resistant material having imperforate ribs displaced therefrom to provide openings through the grid, the outer surfaces of said ribs extending generally parallel with the plane of the grid and serving to deflect laterally and away therefrom any air currents moving substantially normal to said plane, said ribs being so located that there are no openings through the grid normal to the radiant surface, whereby said radiant grid has an emitting surface which is substantially equal in radiant area to the projected area of the grid so as to maximize the area emitting infra-red radiation from the burner;

(h) said ribs having a generally semi-conical configuration and a single normal port within each of said ribs said ribs being arranged in spaced relation and in parallel, spaced-apart rows with the ribs in each row opposite the spaces between the ribs in the rows thereadjacent, the axes of elongation of said ribs all extending in the same direction and all of said ribs being displaced in the same side of said grid;

(i) the lateral edges of said ribs defining said ports which communicate with the aforementioned openings through the grid to form tortuous paths for the flow of combustion products through said grid, the edges of said ribs being so located that the projected areas of said ports normal to the radiant surface are interiorly of said ribs;

(j) whereby the hot combustion gases formed in said combustion zone will course over the ribs of said grid as they are exhausted from said combustion zone through said grid to maximize the transfer of heat from said gases to said grid.

References Cited by the Examiner

UNITED STATES PATENTS

| | | | |
|---|---|---|---|
| 1,614,746 | 1/1927 | Lyon | 158—104 |
| 2,286,366 | 6/1942 | Lea et al. | 126—59.5 |
| 2,362,972 | 11/1944 | Brownback | 158—116 X |
| 2,411,313 | 11/1946 | Zimbelman et al. | 126—85 |
| 2,435,638 | 2/1948 | Shorter. | |
| 2,443,101 | 6/1948 | Flynn et al. | 158—116 |
| 2,632,503 | 3/1953 | Bailey | 158—113 |
| 2,867,207 | 1/1959 | Fulmer | 158—113 X |
| 2,980,104 | 4/1961 | Patrick et al. | 158—113 X |

FOREIGN PATENTS

| | | |
|---|---|---|
| 1,108,655 | 9/1955 | France. |
| 1,128,667 | 8/1956 | France. |
| 16,746 | 1909 | Great Britain. |
| 631,693 | 11/1949 | Great Britain. |
| 708,380 | 5/1954 | Great Britain. |

FREDERICK L. MATTESON, Jr., *Primary Examiner.*